(12) United States Patent
Chou et al.

(10) Patent No.: US 11,736,205 B2
(45) Date of Patent: Aug. 22, 2023

(54) ASYMMETRIC BIDIRECTIONAL OPTICAL WIRELESS COMMUNICATION SYSTEM BASED ON ORBITAL ANGULAR MOMENTUM

(71) Applicant: NATIONAL TAIWAN UNIVERSITY OF SCIENCE AND TECHNOLOGY, Taipei (TW)

(72) Inventors: Hsi-Hsir Chou, Taipei (TW); Kang-Yun Liu, Taipei (TW)

(73) Assignee: NATIONAL TAIWAN UNIVERSITY OF SCIENCE AND TECHNOLO, Taipei (TW)

( * ) Notice: Subject to any disclaimer, the term of this patent is extended or adjusted under 35 U.S.C. 154(b) by 0 days.

(21) Appl. No.: 17/732,899

(22) Filed: Apr. 29, 2022

(65) Prior Publication Data
US 2022/0352991 A1 Nov. 3, 2022

(51) Int. Cl.
*H04B 10/11* (2013.01)
*H04B 10/61* (2013.01)
*H04B 10/25* (2013.01)
*H04J 14/06* (2006.01)
*H04B 10/40* (2013.01)

(52) U.S. Cl.
CPC ....... *H04B 10/614* (2013.01); *H04B 10/2589* (2020.05); *H04B 10/11* (2013.01); *H04B 10/40* (2013.01); *H04B 10/6166* (2013.01); *H04J 14/06* (2013.01)

(58) Field of Classification Search
CPC .. H04B 10/614; H04B 10/2589; H04B 10/11; H04B 10/40; H04B 10/6166; H04B 10/1123; H04J 14/06; H04J 14/04

USPC ................. 398/118–131, 140–172, 182–214
See application file for complete search history.

(56) References Cited

U.S. PATENT DOCUMENTS

| | | | |
|---|---|---|---|
| 2005/0265724 A1* | 12/2005 | Sakanaka | H04B 10/1125 398/140 |
| 2006/0171718 A1* | 8/2006 | Hoshida | H04B 10/532 398/152 |
| 2009/0274462 A1* | 11/2009 | Yu | H04B 10/2587 398/68 |
| 2014/0193152 A1* | 7/2014 | Zhou | H04B 10/27 398/205 |

(Continued)

OTHER PUBLICATIONS

Yue et al, Reconfigurable switching of orbital angular momentum based free space data channels, Dec. 2013, Optics Letters, All Document. (Year: 2013).*

*Primary Examiner* — Dibson J Sanchez
(74) *Attorney, Agent, or Firm* — Chun-Ming Shih; Labway IPR Services

(57) ABSTRACT

An asymmetric bidirectional optical wireless communication system based on orbital angular momentum comprises a system end device and a client end device. The system can split light into P-polarization beam and S-polarization beam, and utilize the orbital angular momentum multiplexing technology to increase the system capacity for uplink transmission in the client end device. In addition, the system also uses the combination of a beam homogenizer and a spatial light modulator to design an orbital angular momentum multiplexer with low energy loss, which can increase the number of orbital angular momentum channels by increasing the effective area of the components.

5 Claims, 3 Drawing Sheets

(56) References Cited

U.S. PATENT DOCUMENTS

| | | | | |
|---|---|---|---|---|
| 2014/0348507 | A1* | 11/2014 | Zhou | H04B 10/272 |
| | | | | 398/65 |
| 2015/0333865 | A1* | 11/2015 | Yu | H04B 10/11 |
| | | | | 398/44 |
| 2016/0028479 | A1* | 1/2016 | Ren | H04B 10/1123 |
| | | | | 398/43 |
| 2016/0041523 | A1* | 2/2016 | Ashrafi | G02B 26/0833 |
| | | | | 359/9 |
| 2016/0202090 | A1* | 7/2016 | Cvijetic | G01S 17/58 |
| | | | | 356/614 |
| 2016/0204896 | A1* | 7/2016 | Yu | H04B 10/11 |
| | | | | 398/65 |
| 2017/0294966 | A1* | 10/2017 | Jia | H04B 10/64 |
| 2018/0167703 | A1* | 6/2018 | Willner | H04J 14/04 |
| 2018/0217235 | A1* | 8/2018 | Skowronek | G01S 7/4814 |
| 2019/0229811 | A1* | 7/2019 | Gupta | H04B 10/614 |
| 2020/0092028 | A1* | 3/2020 | Forbes | H04J 14/02 |
| 2020/0257187 | A1* | 8/2020 | Bartlett | H04N 9/3188 |
| 2021/0105071 | A1* | 4/2021 | Ghannouchi | H04B 10/25759 |
| 2023/0055270 | A1* | 2/2023 | Barrios | H04B 10/1123 |

\* cited by examiner

ASYMMETRIC BIDIRECTIONAL OPTICAL WIRELESS COMMUNICATION SYSTEM BASED ON ORBITAL ANGULAR MOMENTUM

CROSSED-REFERENCE TO RELATED APPLICATION

This application claims priority to and the benefit of Taiwan Patent Application No. 110115929, filed on May 3, 2021, in the Taiwan Intellectual Property Office, the entire content of which is incorporated herein by reference.

BACKGROUND OF THE INVENTION

1. Field of the Invention

The present invention is related to an asymmetric bidirectional optical wireless communication system based on orbital angular momentum, in particular to a bidirectional optical wireless communication system capable of enhancing uplink transmission capacity.

2. Description of the Prior Art

The development of optical wireless communication technology originates from the technologies and ideas proposed to support some areas where it is difficult to install optical fibers and have optical fiber broadband networks. That is, there is no need to use wired media such as optical fibers and cables as the communication media. Therefore, it is also called Free Space Optical Communication (FSOC).

The propagation characteristics of light sources with different wavelength bands transmitted in the transmission channel are not the same. Therefore, it is necessary to select suitable light sources based on different applications and occasions. The selected light sources can be simply sorted into two categories (visible light wireless communication system and invisible light wireless communication system) by their wavelength characteristics.

The conventional free space optical wireless communication architecture, which includes an optical node and an optical terminal, is a symmetrical architecture. That is, there are light emitters, light collimation systems, light modulators, photodetectors (PDs) at both ends so that the system at the client end is too bulky and costly to reduce weight. Besides, the problem of laser collimation also makes the system inconvenient to be moved.

In addition, high-speed uplink transmission cannot be achieved due to the influence of the modulation speed of the spatial modulator. Although the traditional orbital angular momentum (OAM) multiplexer utilizes several beam splitters (BS) and spatial light modulators (SLM) to couple the optical axes of multiple OAM beams to achieve a high data transmission rate, the optical energy will be attenuated by half every time the light passes through the BSs. There is still a severe defect that the attenuation of the actual transmitted optical energy is great.

In order to solve the above problems, the present invention provides an asymmetric system which utilizes a polarizing beam splitter (PBS) at the system end to split the light into an uplink light source (P polarization beam) and a downlink light source (S polarization beam). The present orbital angular momentum multiplexer system not only can increase the transmission channel to improve the uplink data capacity but also can be combined with a beam homogenizer to achieve a relatively low-cost OAM bidirectional optical communication system with low energy consumption, so the present invention should be an optimal solution.

SUMMARY OF THE INVENTION

The present invention provides an asymmetric bidirectional optical wireless communication system based on orbital angular momentum, comprising: a system end device, comprising: a light emitter capable of emitting a set of unmodulated first incident beams; a first polarization beam splitter arranged on a path of the first incident beams for splitting the first incident beams into downlink light beams and uplink light beams, wherein the downlink light beams are modulated and the uplink light beams are unmodulated; a second polarization beam splitter arranged on a path of the downlink light beams and the uplink light beams for combining the downlink light beams and the uplink light beams into second incident beams and then transmitting the second incident beams; and a demultiplexer arranged on a path of orbital angular momentum beams for demodulating the orbital angular momentum beams which are then received by a second photodetector; and a client end device, comprising: a third polarization beam splitter for receiving the second incident beams and splitting the second incident beams into downlink light beams and uplink light beams; an orbital angular momentum multiplexer arranged on a path of the uplink light beams for processing orbital angular momentum modulation on the uplink light beams and generating the orbital angular momentum beams; and a second spatial light modulator arranged on the path of the orbital angular momentum beams for data modulation on the orbital angular momentum beams and then transmitting the modulated orbital angular momentum beams to the demultiplexer of the system end device.

More specifically, the orbital angular momentum multiplexer comprises a first beam homogenizer, a first spatial light modulator, and a second beam homogenizer, and a plurality of orbital angular momentum channels are generated in the orbital angular momentum beams after the orbital angular momentum multiplexer modulates the uplink light beams, and then the orbital angular momentum beams go through the second spatial light modulator and is processed by the second spatial light modulator for data modulation so that different orbital angular momentum channels can carry different digital data.

More specifically, the first beam homogenizer and the second beam homogenizer are lens arrays.

More specifically, the uplink light beams split by the first polarization beam splitter are transmitted straight toward the second polarization beam splitter, and the downlink light beams split by the first polarization beam splitter are reflected to head to the second polarization beam splitter, and then the second polarization beam splitter combines the downlink light beams and the uplink light beams into the second incident beams and sent out the second incident beams.

More specifically, the first incident beams emitted by the light emitter pass through a lens, so that the first incident beams are collimated and incident to the first polarization beam splitter.

More specifically, the client end device further comprises a first photodetector, the first photodetector is provided on a path of the downlink light beams for receiving the downlink light beams.

More specifically, the downlink light beams split by the third polarization beam splitter pass through a lens, so that the downward light beams can be collimated and incident into a first photodetector.

DETAILED DESCRIPTION OF THE PREFERRED EMBODIMENT

Other technical contents, aspects and effects in relation to the present invention can be clearly appreciated through the detailed descriptions concerning the preferred embodiments of the present invention in conjunction with the appended drawings.

Figure 1:
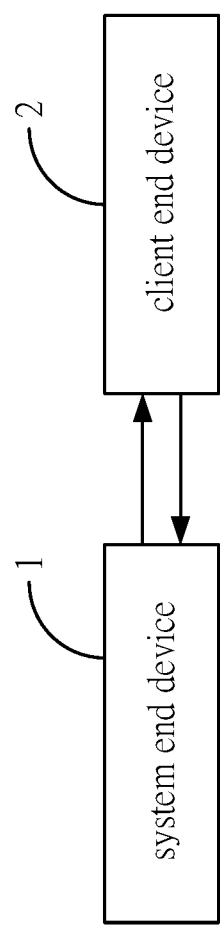
FIG. 1 is a schematic diagram of the overall framework of the asymmetric bidirectional optical wireless communication system based on orbital angular momentum of the present invention.
Figure 2:
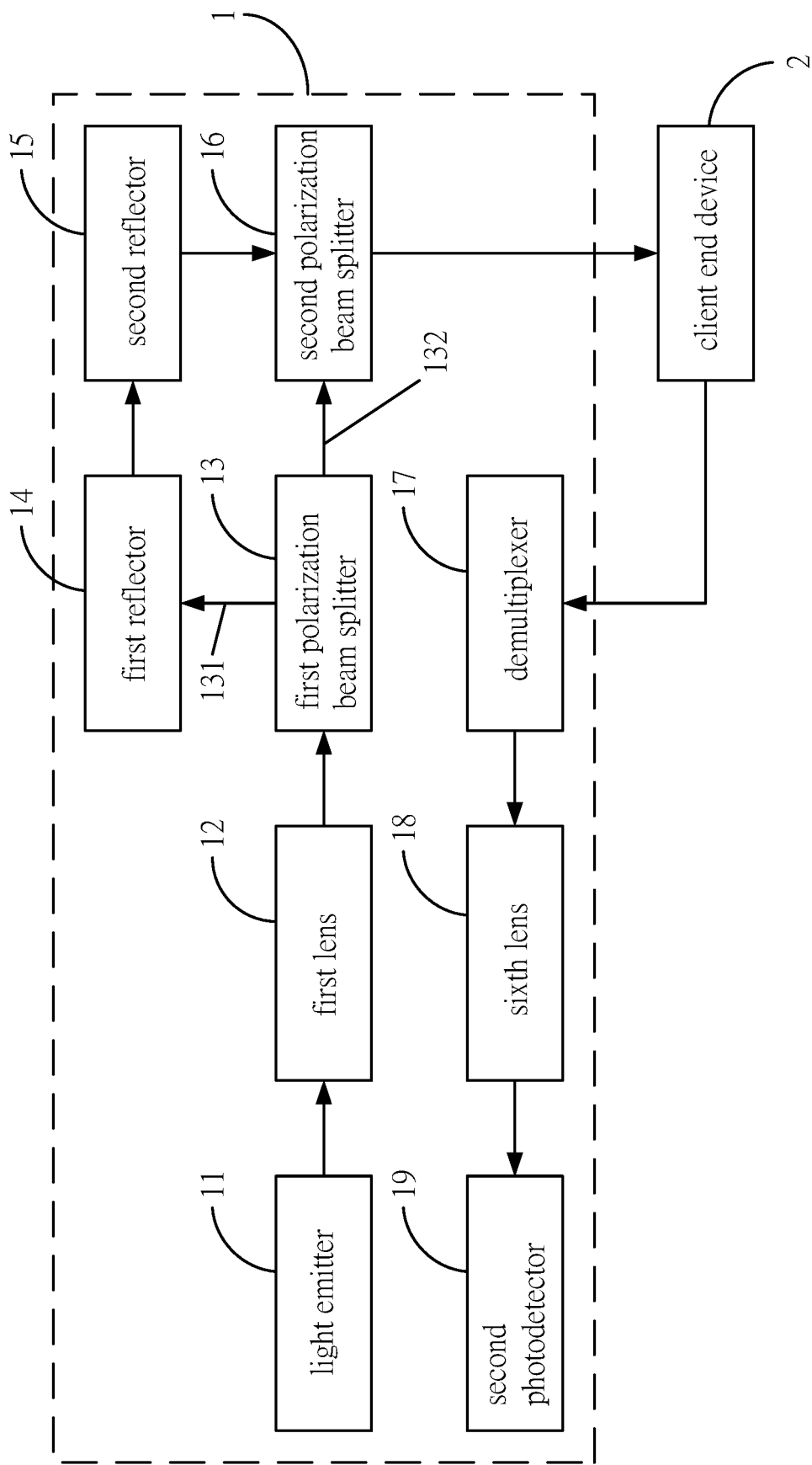
FIG. 2 is a conceptual framework diagram of the system end device of the asymmetric bidirectional optical wireless communication system based on orbital angular momentum of the present invention.

As shown in FIG. 1 and FIG. 2, the asymmetric bidirectional optical wireless communication system based on orbital angular momentum of the present invention comprises a system end device 1 and a client end device 2. The system end device 1 comprises:

(1) a light emitter 11 capable of emitting a set of unmodulated first incident beams. The unmodulated first incident beams have a specific wavelength range, and the first incident beams can pass through a first lens 12 to collimate and enter a first polarization beam splitter 13.

(2) a first polarization beam splitter 13 arranged on a path of the first incident beams for splitting the first incident beams into two polarization beams such as downlink light beams 131 (vertical S polarization beams) and uplink light beams 132 (horizontal P polarization beams). The downlink light beams are modulated and the uplink light beams are unmodulated. Besides, the uplink light beams split by the first polarization beam splitter 13 are transmitted straight toward the second polarization beam splitter 16, and the downlink light beams split by the first polarization beam splitter 13 are modulated and reflected to head to the second polarization beam splitter 16 by passing through the first reflector 14 (reflective external modulator) and the second reflector 15 (reflective mirror).

(3) a second polarization beam splitter 16 arranged on a path of the downlink light beams and the uplink light beams for combining the downlink light beams and the uplink light beams into second incident beams and then transmitting the second incident beams.

(4) a demultiplexer 17 arranged on a path of orbital angular momentum beams. The demultiplexer 17 is composed of multiple lens and reflective mirrors and is used for demodulating the orbital angular momentum beams which then pass through a sixth lens 18 and are received by a second photodetector 19.

Figure 3:
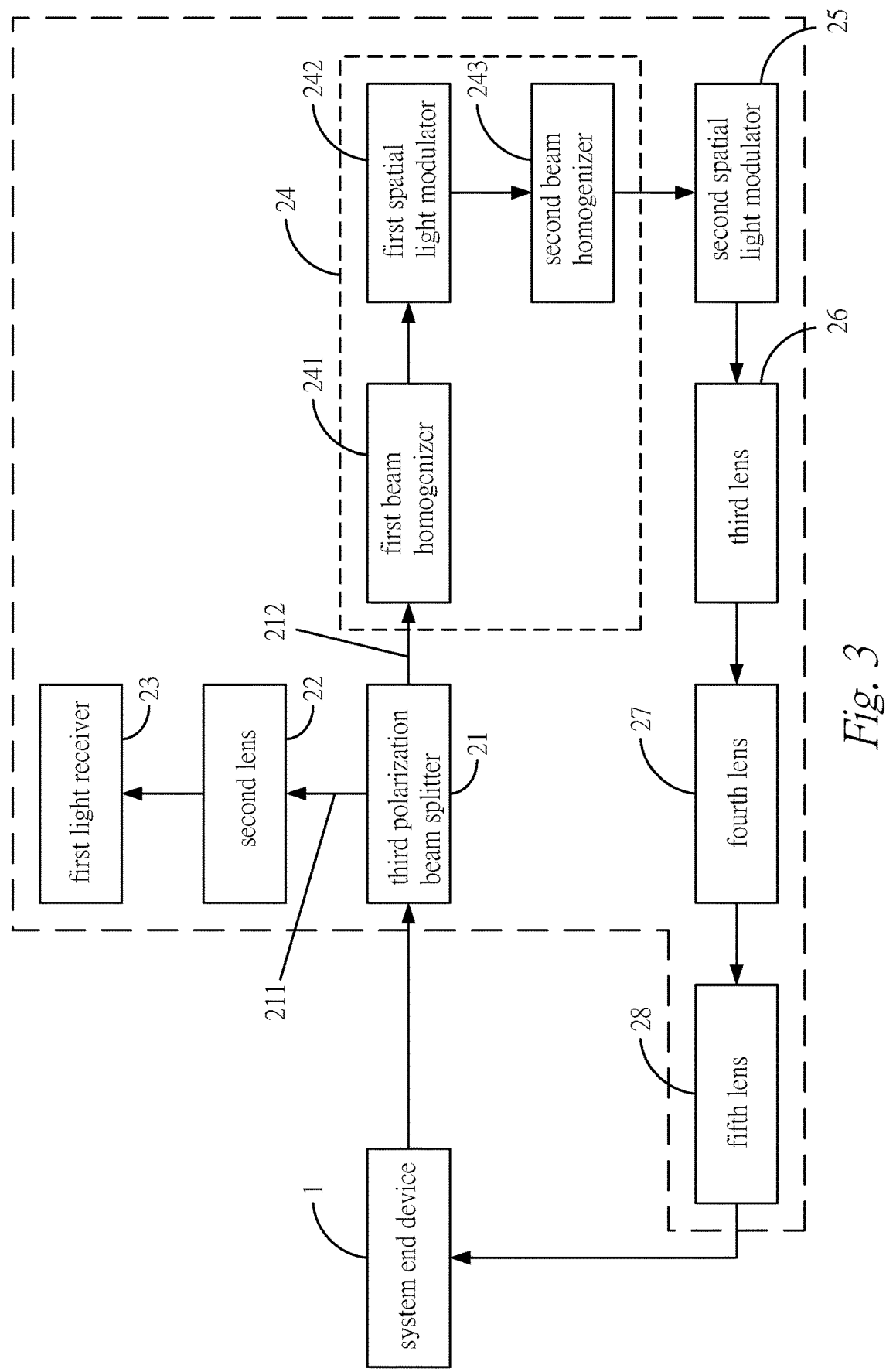
FIG. 3 is a conceptual framework diagram of the client end device of asymmetric bidirectional optical wireless communication system based on orbital angular momentum of the present invention.

As shown in FIG. 3, the client end device 2 comprises:

(1) a third polarization beam splitter 21 for receiving the second incident beams and splitting the second incident beams into downlink light beams 211 and uplink light beams 212. The downlink light beams 211 pass through a second lens 22 and are incident to a first photodetector 23, then the downlink light beams 211 are received by the first photodetector 23.

(2) an orbital angular momentum multiplexer 24 arranged on a path of the uplink light beams for processing orbital angular momentum modulation on the uplink light beams and generating the orbital angular momentum beams.

(3) a second spatial light modulator 25 arranged on a path of the orbital angular momentum beams for data modulation on the orbital angular momentum beams and then transmitting the modulated orbital angular momentum beams to the demultiplexer 17 of the system end device 1.

The orbital angular momentum multiplexer 24 comprises a first beam homogenizer 241, a first spatial light modulator 242, and a second beam homogenizer 243. The first beam homogenizer 241 and the second beam homogenizer 243 separates the incident beams to a plurality of smaller beams (orbital angular momentum beams) using lens array (Lenslets Array). Different light beams are injected to different positions of the first spatial light modulator 242, so the first spatial light modulator 242 can modulate every light beam (and thus a plurality of orbital angular momentum channels are generated). Then, the orbital angular momentum beams go through the second spatial light modulator 25 and is processed by the second spatial light modulator 25 for data modulation so that different orbital angular momentum channels can carry different digital data.

After that, multiple orbital angular momentum beams are coupled after reflecting to the third lens 26 by the second spatial light modulator 25 and multiple orbital angular momentum channels are overlapped. Then, the orbital angular momentum beams maintain the coupling status by means of the fourth lens 27 and the fifth lens 28 to achieve distant transmission to the system end device 1.

After the demultiplexer 17 of the system end device 1 receives the orbital angular momentum beams, the orbital angular momentum beams are demodulated by the demultiplexer 17 into different orbital angular momentum modes (utilizing the characteristics that different OAM modes have different diameters to extract each OAM mode), and finally pass through the sixth lens 18 to enter the second photodetector 19.

The OOK is used for uplink data transmission test, in which the data measurements of four spatial channels (channel A, B, C, D) in different OAM modes are used to verify the system performance of the present architecture, and the measurement results are described in Table 1 below. In the present invention, four channels and seven different OAM modes (for 1=15~21) are measured, and the measurement results show that the highest data transmission rate that can be measured by channels A and C is 1.4 Gb/s, while that can be measured by channels B and D is up to 1.3 Gb/s.

TABLE 1 data transmission rate of OOK eye diagram in Channel A, Channel B, Channel C, and Channel D

|  | Channel A | Channel B | Channel C | Channel D |
| --- | --- | --- | --- | --- |
| I = 15 | 1 Gb/s | 1 Gb/s | 1 Gb/s | 0.9 Gb/s |
| I = 16 | 1.2 Gb/s | 1.2 Gb/s | 1.2 Gb/s | 0.9 Gb/s |
| I = 17 | 1.3 Gb/s | 1.2 Gb/s | 1.3 Gb/s | 1 Gb/s |
| I = 18 | 1.3 Gb/s | 1.2 Gb/s | 1.3 Gb/s | 1.1 Gb/s |

TABLE 1-continued data transmission rate of OOK eye diagram in Channel
A, Channel B, Channel C, and Channel D

|  | Channel A | Channel B | Channel C | Channel D |
| --- | --- | --- | --- | --- |
| I = 19 | 1.3 Gb/s | 1.3 Gb/s | 1.3 Gb/s | 1.2 Gb/s |
| I = 20 | 1.4 Gb/s | 1.3 Gb/s | 1.4 Gb/s | 1.2 Gb/s |
| I = 21 | 1.4 Gb/s | 1.3 Gb/s | 1.4 Gb/s | 1.3 Gb/s |

The uplink transmission in the present invention can reach a data capacity of more than 3.6 Gb/s (the total capacity of four channels). In addition, QPSK is used for the downlink data transmission test in the present invention, and the downlink data transmission rate can reach up to 2.2 Gb/s.

Compared with other conventional technologies, the asymmetric bidirectional optical wireless communication system based on self-injection lock provided in the present invention has the advantage of:

(1) The OAM multiplexer designed in the present invention is used in the client end device to solve the problem of low uplink transmission capacity of the traditional asymmetric system, and the present system has relatively low cost, low loss and smaller system size and other advantages compared to the traditional OAM system.

(2) In the aspect of the OAM multiplexer, the present invention has made improvements on the need for multiple spatial modulators to generate multiple OAM modes in the past. In addition to avoiding the energy attenuation caused by the use of the BS, the present invention uses a single spatial light modulator in combination with a laser beam homogenizer to generate multiple OAM modes simultaneously.

(3) The present invention uses two lens arrays (Lenslet Array, LA) and a reflective SLM to form a laser beam homogenizer (Laser Beam Homogenizing) combined with an OAM optical system. The advantage of this multiplexer is that one spatial modulator can arbitrarily generate multiple OAM modes simultaneously and reducing excessive insertion loss caused by coupling between traditional OAM modes can be achieved.

Although the present invention has been disclosed through the aforementioned embodiments, such illustrations are by no means used to restrict the scope of the present invention. That is, any person having ordinary skill in relevant fields of the present invention can certainly devise any applicable alterations and modifications after having comprehended the aforementioned technical characteristics and embodiments of the present invention within the spirit and scope thereof. Hence, the scope of the present invention to be protected under patent laws should be delineated in accordance with the claims set forth hereunder in the present specification.

What is claimed is:

1. An asymmetric bidirectional optical wireless communication system based on orbital angular momentum, comprising:
   a system end device, comprising:
   a light emitter capable of emitting a set of unmodulated first incident beams;
   a first polarization beam splitter arranged on a path of the first incident beams for splitting the first incident beams into downlink light beams and uplink light beams, wherein the downlink light beams are modulated and the uplink light beams are unmodulated;
   a second polarization beam splitter arranged on a path of the downlink light beams and the uplink light beams for combining the downlink light beams and the uplink light beams into second incident beams and then transmitting the second incident beams; and
   a demultiplexer arranged on a path of orbital angular momentum beams for demodulating the orbital angular momentum beams which are then received by a second photodetector; and
   a client end device, comprising:
   a first photodetector provided on a path of the downlink light beams for receiving the downlink light beams;
   a third polarization beam splitter for receiving the second incident beams and splitting the second incident beams into downlink light beams and uplink light beams;
   an orbital angular momentum multiplexer arranged on a path of the uplink light beams for processing orbital angular momentum modulation on the uplink light beams and generating the orbital angular momentum beams, wherein the orbital angular momentum multiplexer comprises a first beam homogenizer, a first spatial light modulator, and a second beam homogenizer, the first beam homogenizer and the second beam homogenizer separates incident beams to a plurality of orbital angular momentum beams using lens array, and a plurality of orbital angular momentum channels are generated in the orbital angular momentum beams after the orbital angular momentum multiplexer modulates the uplink light beams, and then the orbital angular momentum beams go through a second spatial light modulator and is processed by the second spatial light modulator for data modulation so that different orbital angular momentum channels can carry different digital data; and
   the second spatial light modulator arranged on the path of the orbital angular momentum beams for data modulation on the orbital angular momentum beams and then transmitting the modulated orbital angular momentum beams to the demultiplexer of the system end device.

2. The asymmetric bidirectional optical wireless communication system based on orbital angular momentum of claim 1, wherein the first beam homogenizer and the second beam homogenizer are lens arrays.

3. The asymmetric bidirectional optical wireless communication system based on orbital angular momentum of claim 1, wherein the uplink light beams split by the first polarization beam splitter are transmitted straight toward the second polarization beam splitter, and the downlink light beams split by the first polarization beam splitter are reflected to head to the second polarization beam splitter, and then the second polarization beam splitter combines the downlink light beams and the uplink light beams into second incident beams and sent out the second incident beams.

4. The asymmetric bidirectional optical wireless communication system based on orbital angular momentum of claim 1, wherein the first incident beams emitted by the light emitter pass through a lens, so that the first incident beams are collimated and incident to the first polarization beam splitter.

5. The asymmetric bidirectional optical wireless communication system based on orbital angular momentum of claim 4, wherein the downlink light beams split by the third polarization beam splitter pass through a lens, so that the downward light beams can be collimated and incident into the first photodetector.

* * * * *